(12) United States Patent
Chen

(10) Patent No.: US 8,717,320 B2
(45) Date of Patent: May 6, 2014

(54) METHOD FOR COMPENSATING TIME DIFFERENCE BETWEEN IMAGES AND ELECTRONIC APPARATUS USING THE SAME

(75) Inventor: Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 230 days.

(21) Appl. No.: 13/298,300

(22) Filed: Nov. 17, 2011

(65) Prior Publication Data

US 2012/0162139 A1 Jun. 28, 2012

(30) Foreign Application Priority Data

Dec. 24, 2010 (TW) ................................ 99145906 A

(51) Int. Cl.
*G09G 5/00* (2006.01)
(52) U.S. Cl.
USPC ..... 345/173; 345/176; 178/18.01; 178/18.09; 178/18.11; 382/218
(58) Field of Classification Search
USPC .................... 345/173–178; 178/18.01–18.11; 382/218
See application file for complete search history.

(56) References Cited

U.S. PATENT DOCUMENTS

| 2003/0043116 A1* | 3/2003 | Morrison et al. ............. 345/158 |
| 2008/0143690 A1* | 6/2008 | Jang et al. ..................... 345/175 |
| 2012/0146949 A1* | 6/2012 | Chen ............................. 345/175 |

OTHER PUBLICATIONS

"Office Action of China Counterpart Application", issued on Jan. 6, 2014, p. 1-p. 9.

* cited by examiner

*Primary Examiner* — Quan-Zhen Wang
*Assistant Examiner* — Jennifer Nguyen
(74) *Attorney, Agent, or Firm* — Jianq Chyun IP Office

(57) ABSTRACT

A method for compensating time difference between images and electronic apparatus using the same method are provided. Input images are received by a plurality of image capturing units respectively. Each input image is checked to see whether a reference area and a reference area background are the same. When the reference area of the input image received from one of the image capturing units is not the same as the reference area background, a compensation image number is accumulated, and other input images are received continually until the reference area of each input image received from the image capturing unit is not the same as the reference area background. Afterwards, time difference between the input images received from a plurality of image capturing units is compensated according to the compensation image numbers.

16 Claims, 5 Drawing Sheets

US 8,717,320 B2

METHOD FOR COMPENSATING TIME DIFFERENCE BETWEEN IMAGES AND ELECTRONIC APPARATUS USING THE SAME

CROSS-REFERENCE TO RELATED APPLICATION

This application claims the priority benefit of Taiwan application serial no. 99145906, filed on Dec. 24, 2010. The entirety of the above-mentioned patent application is hereby incorporated by reference herein and made a part of this specification.

BACKGROUND OF THE INVENTION

1. Field of the Invention

The invention is related to an image processing method between a plurality of image capturing units, and more particularly, to a method for compensating time difference between images and an electronic apparatus using the same.

2. Description of Related Art

At present, the touch-sensitive technology can be generally classified into three types, namely, resistance type, capacitance type, and optical type. To the display panel in large size, the optical type touch-sensitive technology has the advantage of low costs. In the optical type touch-sensitive technology, infrared ray light sources are disposed around a screen. When an object approaches or touches the screen, a shadow is generated since the infrared ray is obstructed by the object. Then, an infrared camera and a sensor captures the information of the shadow such as the direction, the width, the height, and tip point, etc. so as to calculate the position of the touch point and thereby achieve the touch-sensitive function.

Accordingly, in an optical type touch-sensitive apparatus having a plurality of image capturing units, time differences usually occur between input images of the image capturing units. In the optical type touch-sensitive apparatus, the time differences existing between all of the captured images will cause a calculating deviation of a touch point.

SUMMARY OF THE INVENTION

The invention provides a method for compensating time difference between images suitable for an electronic apparatus. The method includes following steps: respectively setting a reference area and a reference area background for each of a plurality of image capturing units; respectively receiving an input image from each of the image capturing units, and respectively checking whether the reference area of each of the input images is the same as the corresponding reference area background. When the reference area of the input image received from one of the image capturing units is not the same as the corresponding reference area background, the other image capturing units receiving the input images having the reference areas and the corresponding reference area backgrounds are the same continually receive another input image and respectively accumulate a compensation image number once. Then, the above method is repeated, namely, the input images continually received are checked to see whether each of the reference areas of input images is the same as the corresponding reference area background, and whether to accumulate the compensation image number according to a result is determined. When the reference area of the input image received from each of the image capturing units is not the same as the corresponding reference area background, time difference of each image capturing units between the input images are compensated according to the compensation image numbers respectively corresponding to each of the image capturing units.

In the method, the compensation image numbers of the image capturing units are all the same, e.g. zero, in the beginning. After the step of checking whether the reference area of each of the input images is the same as the corresponding reference area background, when the reference area of all of the input images received from the image capturing units is the same as the corresponding reference area background, the compensation image numbers of all the image capturing units are set to the same value, e.g. zero.

In the method, the input image of each of the image capturing unit includes the bottom portion of the input image, a screen area, and the upper portion of the input image, an environment area excluding the screen, wherein a position of the reference area is set to be located in the environment area. When a system starts, an image of the reference area is built as the reference area background. Then, the reference area retrieved from each of the input image and is compared with the reference area background, and whether the reference area of each of the input images is the same as the reference area background is determined.

In the step of comparing the reference area with the reference area background, the reference area background is subtracted from the reference area of the input image so as to obtain a background removed image. Besides, after noise of the background removed image is removed according to a first threshold value, a binary conversation is performed on the background removed image to obtain a binary conversation image. Then, the number of white spots of each of a plurality of columns of the binary conversation image is calculated so as to compare the number of the white spots of each column with a second threshold value. When the number of the white spots is less than the second threshold value, it is determined that the reference area is the same as the reference area background. When the number of the white spots is greater than the second threshold value, it is determined that the reference area is not the same as the reference area background.

The invention provides electronic apparatus includes a plurality of image capturing units respectively disposed in difference positions of the electronic apparatus and a processing unit. The processing unit is coupled to the image capturing units. The processing unit respectively receives input images from the image capturing units, and then checks whether the reference area of each of the input images is the same as the reference area background. When the reference area of the input image received from one of the image capturing units is not the same as the reference area background, and the reference areas of the input images received from the other image capturing units are the same as the reference area backgrounds, the other input images are continually received and a compensation image number corresponding to the image capturing unit is accumulated once. Then, the above method is repeated, namely, whether the reference area of each of the input images continually received is the same as the reference area background is determined, and whether to accumulate the compensation image number according to a result is determined. When all of the input images received from the image capturing units are different from the reference area backgrounds, time differences between the input images are compensated according to the compensation image numbers respectively corresponding to the image capturing units.

The processing unit capturing unit respectively receives the input image from each of the image capturing units and sets the reference areas respectively corresponding to the image capturing units. The input image includes a screen area and an environment area, and a position of the reference area is located in the environment area. When image compensation operation is started to perform, an image of the reference area is built as the reference area background. Then, the reference area retrieved from each of the input image is compared with the reference area background, and whether the reference area of each of the input images is the same as the reference area background is determined.

The electronic apparatus further includes a storage unit. The storage unit is coupled to the processing unit for storing the input images capturing by the image capturing units. The processing unit reads out one input image respectively corresponding to each of the image capturing units from the storage unit according to compensation image numbers.

In an embodiment of the invention, the electronic apparatus is an optical touch panel.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to make the invention more comprehensible, embodiments are described below as the examples to prove that the invention can actually be realized.

Figure 1:
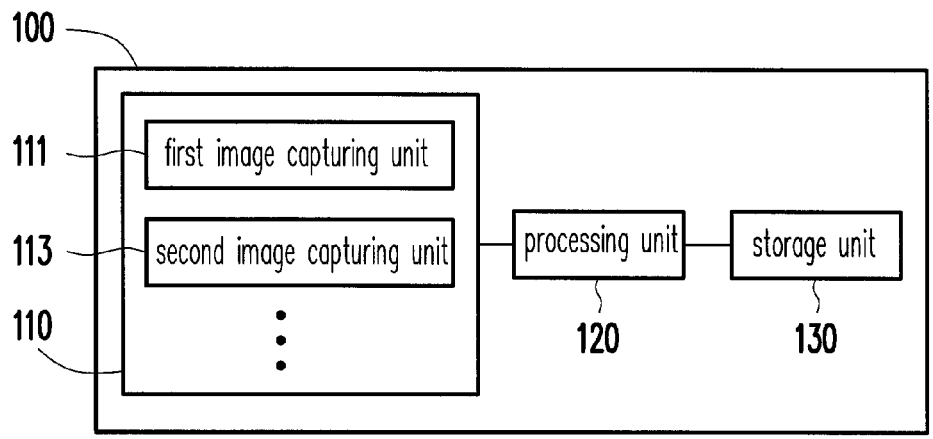
FIG. 1 is a block diagram of an electronic apparatus according to an embodiment of the invention.

FIG. 1 is a block diagram of an electronic apparatus according to an embodiment of the invention. Referring to FIG. 1, an electronic apparatus 100 includes a plurality of image capturing units 110 respectively disposed in difference positions of the electronic apparatus 100, a processing unit 120, and a storage unit 130. To simplify explanation, only two image capturing units 110 (i.e., a first image capturing unit 111 and a second image capturing unit 113) are illustrated for description in the embodiment.

The processing unit 120 is coupled to the first image capturing unit 111 and the second image capturing unit 113, and respectively receives input images from the first image capturing unit 111 and the second image capturing unit 113. Besides, the processing unit 120 performs a method for compensating time difference between images according to the received input images so as to calculate a compensation image number between the input image of the first image capturing unit 111 and the input image of the second image capturing unit 113, and accordingly compensates the time difference between the input image of the first image capturing unit 111 and the input image of the second image capturing unit 113. For example, it is assumed that a reference area and a reference area background of each of the $1^{st}$ and the $2^{nd}$ input images of the first image capturing unit 111 are the same, a reference area and a reference area background of the $3^{rd}$ input image of the first image capturing unit 111 are different. In addition, a reference area and a reference area background of each of the $1^{st}$ to $4^{th}$ input images of the second image capturing unit 113 are the same, while a reference area and a reference area background of the $5^{th}$ input image of the first image capturing unit 113 are different. Then, the time difference between the input images of the first image capturing unit 111 and the input images of the second image capturing unit 113 are the time to capture two images. Accordingly, replace the $3^{rd}$ input image of the second image capturing unit 113 original corresponding to the $3^{rd}$ input image of the first image capturing unit 111 with the $5^{th}$ input image of the second image capturing unit 113 so as to reduce the time difference of the input images between the first image capturing unit 111 and the second image capturing unit 113.

The storage unit 130 is coupled to the processing unit 120 for storing the input images captured by the image capturing units 110. The processing unit 120 calculates a compensation image number, and respectively reads out the input images of the first image capturing unit 111 and the second image capturing unit 113 according to the compensation image number. For example, it is assumed that the reference area and the reference area background of the $1^{st}$ input image of the first image capturing unit 111 are different, while the second image capturing unit 113 determines the reference area and the reference area background of the $4^{th}$ input image thereof are different, which means that the time difference between the input images of the second image capturing unit 113 and the input images of the first image capturing unit 111 are the time to capture three images. Then, when performing the calculation of a touch point by reading out the input images of each of the image capturing units, the processing unit 120 reads out the $1^{St}$ input image of the first image capturing unit 111 and the $4^{th}$ input images of the second image capturing unit 113 to calculate the touch point.

Figure 2:
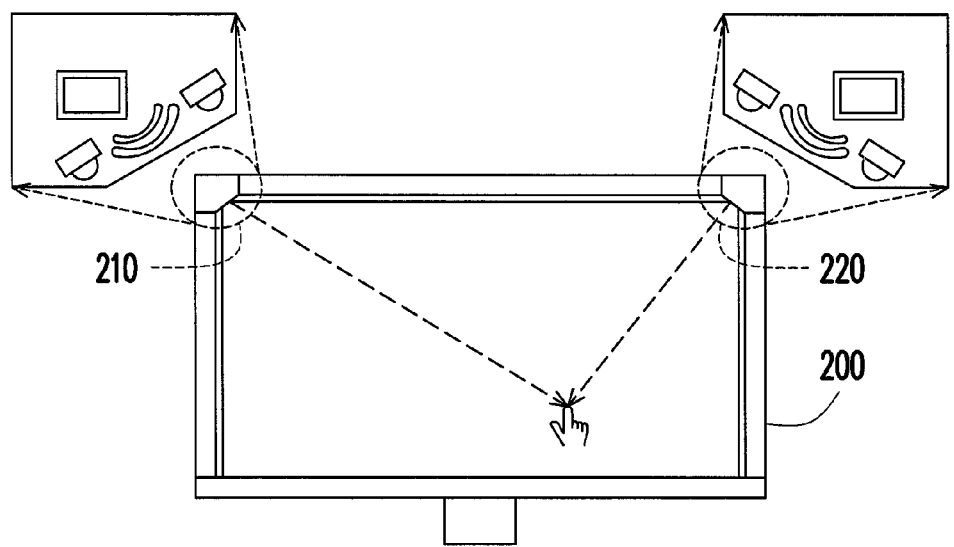
FIG. 2 is a visual schematic diagram of an optical touch panel according to an embodiment of the invention.

Herein, the electronic apparatus 110 is, for example, an optical touch penal. For example, FIG. 2 is a visual schematic diagram of an optical touch panel according to an embodiment of the invention. Referring to FIG. 2, in the embodiment, a first image capturing unit 210 and a second image capturing unit 220 are disposed above an optical touch penal 200, and a processing unit (not shown) and a storage unit (not shown) are also disposed in the optical touch penal 200. The processing unit calculates a position of a touch point according to input images captured by the first image capturing unit 210 and the second image capturing unit 220.

Figure 3:
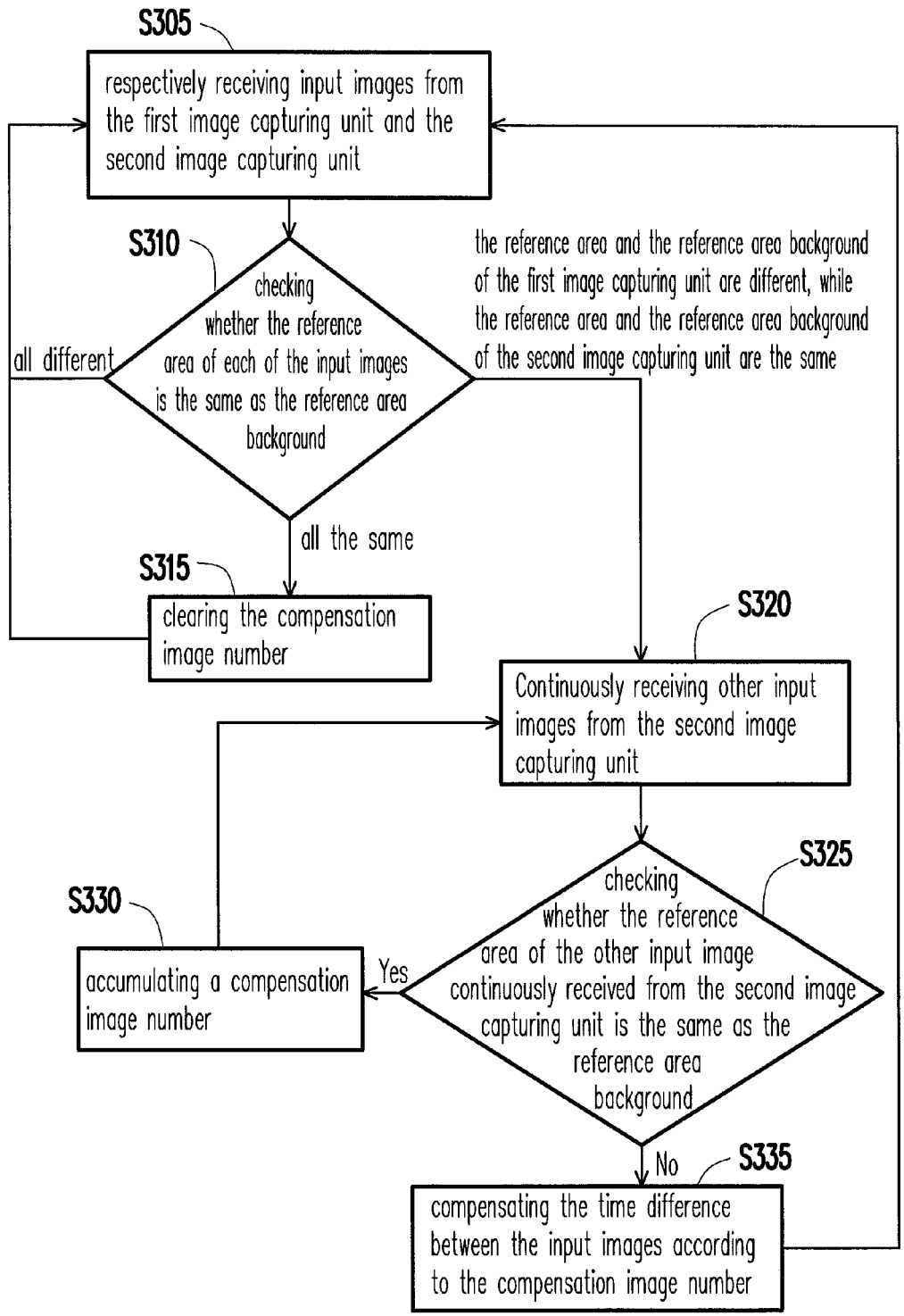
FIG. 3 is a flow chart of a method for compensating time difference between images according to an embodiment of the invention.

The following illustrates each steps of a method for compensating time difference between images in cooperation with the above electronic apparatus 100. FIG. 3 is a flow chart of a method for compensating time difference between images according to an embodiment of the invention. Referring to both FIG. 1 and FIG. 3, in step S305, the processing unit 120 respectively receives input images from the first image capturing unit 111 and the second image capturing unit 113. Besides, the processing unit 120 stores the received input images in the storage unit 130.

Then, in step S310, the processing unit 120 checks whether the reference area of each of the input images is the same as the reference area background, so as to determine whether a target object touches the reference area. For example, when the operation of the image compensation is started to perform, a position of the reference area may be set in the input images captured by the first image capturing unit 111 and the second image capturing unit 113 and accordingly whether the reference area is the same as the reference area background is determined. The reference area may be a straight line or a bar-shaped range.

Specifically, the processing unit 120 presets the reference area. The input image includes a screen area and an environment area, and the position of the reference area is located in the environment area. When the first image capturing unit 111 and the second image capturing unit 113 start to perform, the processing unit 120 respectively retrieves the reference area backgrounds of the input images received from the first image capturing unit 111 and the second image capturing unit 113 according to the preset position of the reference area.

In general, the first image capturing unit 111 and the second image capturing unit 113 are respectively disposed at two corners of a screen and photograph the screen to generate the input images. Afterwards, the processing unit 120 receives the input images and compares the reference area and the corresponding reference area background so as to check whether the reference area is the same as the reference area background.

Figure 4:
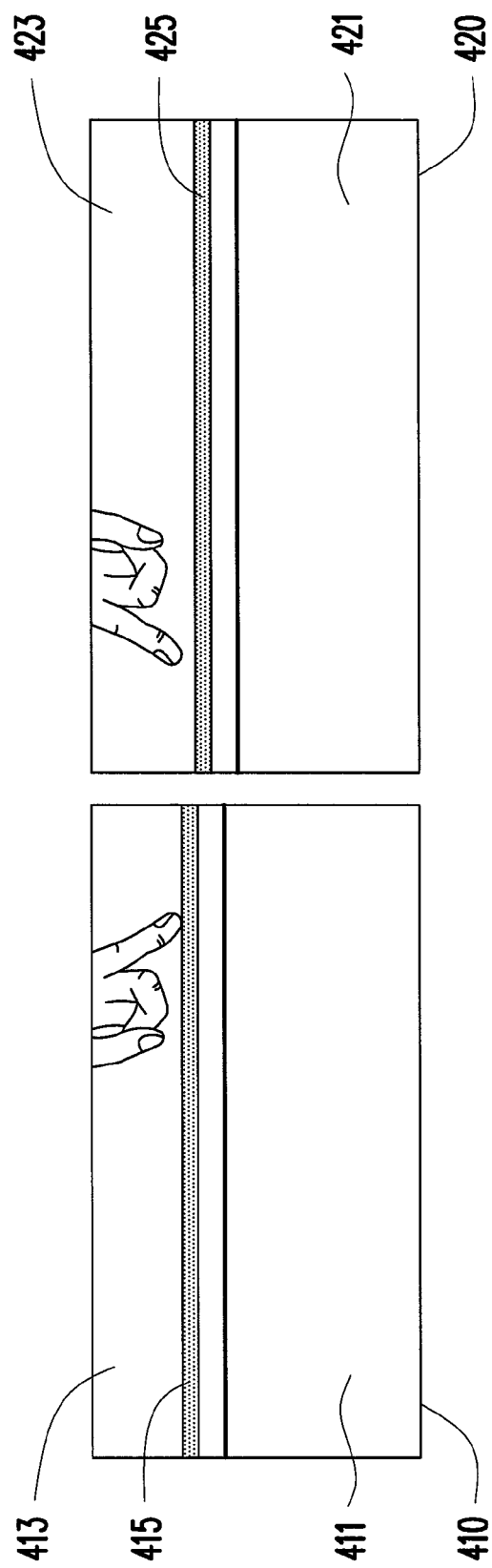
FIG. 4 is a schematic view of an input image according to an embodiment of the invention.

For example, FIG. 4 is a schematic view of an input image according to an embodiment of the invention. Referring to both FIG. 1 and FIG. 4, herein, it is assumed that a first input image 410 is captured by the first image capturing unit 111 and a second input image 420 is captured by the second image capturing unit 113. Beside, it is assumed that the first image capturing unit 111 and the second image capturing unit 113 are respectively disposed at two corners on the left and the right sides above the screen and photograph the screen (as shown in FIG. 2) to generate the input images.

Herein, the screen is photographed and shown in the bottom portions of the input image 410 and the input image 420, and other scenes excluding the screen are photographed and shown in the upper portions of the input image 410 and the input image 420. Namely, the bottom portions of the input image 410 and the input image 420 are respectively a screen area 411 and a screen area 421, and the upper portions of the input image 410 and the input image 420 are respectively an environment area 413 and an environment area 423. The environment area 413 of the input image 410 and the environment area 423 of the input image 420 respectively include a reference area 415 and a reference area 425, and the reference area 415 and the reference area 425 are respectively smaller than the environment area 413 and the environment area 423.

Figure 5:
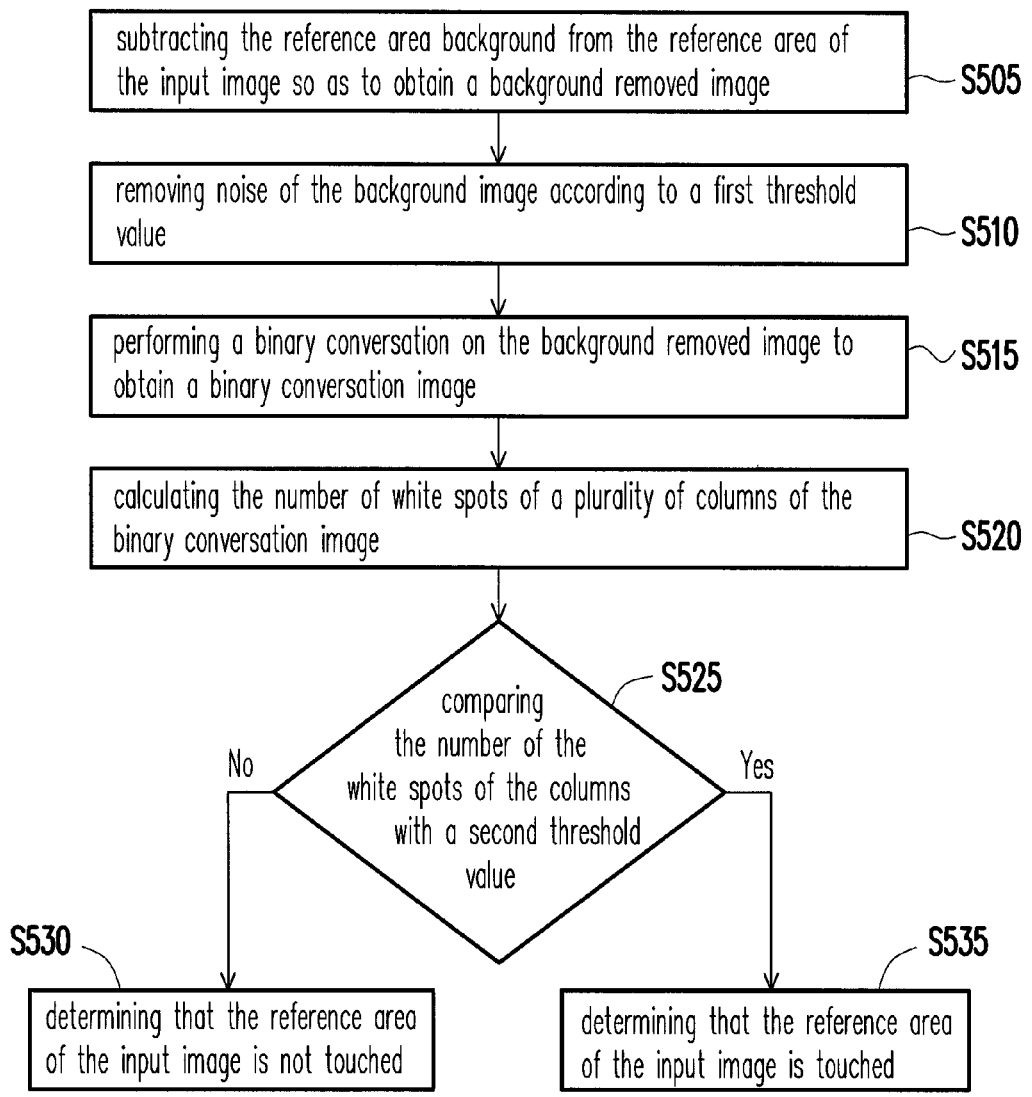
FIG. 5 is a flow chart of a method of checking whether a reference area and a reference area background is the same according to an embodiment of the invention.
Figure 6A:
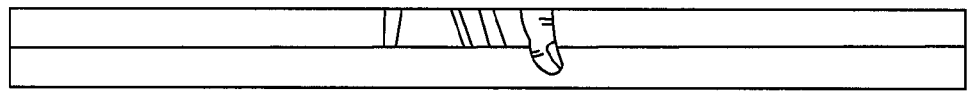
FIG. 6A to FIG. 6D are schematic diagrams of a reference area according to an embodiment of the invention.
Figure 6B:

For the input image 410, the processing unit 120 compares the reference area 415 and the corresponding reference area background previously stored in the storage unit 130, and accordingly checks whether the reference area 415 is the same as the corresponding reference area background. For example, FIG. 5 is a flow chart of a method of checking whether the reference area and the reference area background is the same according to an embodiment of the invention. FIG. 6A to FIG. 6D are image schematic diagrams of checking whether the reference area of the input image is the same as the reference area background according to an embodiment of the invention. Referring to FIG. 5 and FIG. 6A to FIG. 6D, FIG. 6A shows the reference area of the input image. In step S505, the reference area background is subtracted from the reference area of the input image so as to obtain a background removed image as shown in FIG. 6B.

Figure 6C:
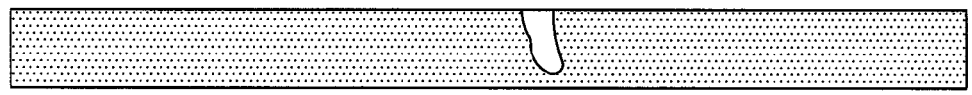

Then, in step S510, noise of the background removed image FIG. 6B is removed according to a first threshold value. Afterwards, in step S515, a binary conversation is performed on the background removed image to obtain a binary conversation image as shown in FIG. 6C. In FIG. 6C, dotted patterns represent a black area.

Figure 6D:

Then, in step S520, the number of white spots of a plurality of columns of the binary conversation image FIG. 6C is calculated, and the number of the white spots of the columns is compared with a second threshold value in step 525. For example, a bar diagram (or number distribution of the white spots) as shown in FIG. 6D can be obtained by calculating statistics for the number of the white spots of each columns of the binary conversation image FIG. 6C. When the number of the white spots is less than the second threshold value, it is determined that the reference area is the same as the reference area background, and step S530 is performed. When the number of the white spots is greater than the second threshold value, it is determined that the reference area is not the same as the reference area background, and step S535 is performed.

Referring back to FIG. 3, in step S310, when the reference area and the reference area background of the input image of the first image capturing unit 111 are different, and the reference area and the reference area background of the input image of the second image capturing unit 113 are also different, step S305 is continuously performed, namely, receiving the input images of the first image capturing unit 111 and the second image capturing unit 113 to calculate the position of the touch point of the target object.

When the reference area of the input image received by the first image capturing unit 111 is not the same as the reference area background, while the reference area received by the second image capturing unit 113 is the same as the reference area background, it means that time difference exists between the input images of the first image capturing unit 111 and the input image of the second image capturing unit 113. At this time, step S320 is performed, i.e., continuously receiving other input images from the second image capturing unit 113. Then, in step S325, whether the reference area of the other input image continuously received from the second image capturing unit 113 is the same as the reference area background is checked.

When the reference area of the other input image continuously received from the second image capturing unit 113 is the same as the reference area background, step S330 is performed, i.e., accumulating a compensation image number. Then, the procedure returns to step S320 and step S325 and the second image capturing unit 113 continuously checks a still another input image continuously received from the second image capturing unit 113 to see whether the reference area thereof is the same as the reference area background. When the reference area of the still another input image received by the second image capturing unit 113 is not the same as the reference area background, step S335 is performed, i.e., compensating the time difference between the input images according to the compensation image number. In other words, when the reference area of the input image captured by one of the image capturing units is different from the reference area background, the number of the lagging images of the image capturing unit with the same reference area and reference area background is calculated until the reference area and reference area background of the input image are different so as to use the number of the lagging images as the compensation image number.

Afterwards, the procedure returns to step S305, i.e., respectively receiving the input images of the first image capturing unit 111 and the second image capturing unit 113 according to the compensation image number. Herein, the time to receive the input images from the first image capturing unit 111 and the second image capturing unit 113 may be directly set. For example, if the input images of the second image capturing unit 113 lags the input images of the first image capturing unit 111 by three input images, the time to receive the input images of the first image capturing unit 111 may be delayed by three input images or the time to receive the input images of the second image capturing unit 113 may be advanced by three input images. Alternatively, after the input images are stored in the storage unit 130, the input images of the first image capturing unit 111 and the second image capturing unit 113 may be read out from the storage unit 130 according to the compensation image number. For example, if the input images of the second image capturing unit 113 lags the input images of the first image capturing unit 111 by three input images, the processing unit 120 reads out the $1^{St}$ input image of the first image capturing unit 111 while reads out the $4^{th}$ input image of the second image capturing unit 113.

In addition, in step S310, if the reference area of the input image received from the first image capturing unit 111 is the same as the reference area background and the reference area of the input image received from the second image capturing unit 113 is also the same as the reference area background, it means that no target object to be touch the screen currently. Then, as shown in step S315, the compensation image number is cleared. Afterwards, the procedure returns to step S305.

It should be noted that the reference area is set in the environment area, and the distance between the reference area in the environment area and the upper portion of the input image is the closer the better. This is because when the reference area and the reference area background are determined as being different, the calculation of the compensation number can start to perform and the position of the touch point corresponding to the input image is obtained according to the compensation number. Accordingly, when whether the reference area is the same as the reference area background is determined earlier, the calculation of the touch point is calculated earlier.

To sum up, in the invention, the reference area is built in each of the input images. When the reference area of an input image captured by some image capturing unit is not the same as the reference area background, the number of the lagging images of the image capturing unit with the same reference area and reference area background is calculated so as to compensate the time difference between the input images received from different image capturing units.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for compensating time difference between images, suitable for an electronic apparatus, the method comprising:
   respectively setting a reference area and a reference area background for each of a plurality of image capturing units;
   respectively receiving a first input image from each of the image capturing units;
   respectively checking whether the reference area of each of the first input images is the same as the corresponding reference area background;
   when the reference area of the first input image received from one of the image capturing units is not the same as the corresponding reference area background, and the reference areas of the first input images received from the other image capturing units are the same as the reference area backgrounds, the other image capturing units continually receive a second input image and respectively accumulate a compensation image number corresponding to each of the other image capturing units;
   checking the second input image received from each of the other image capturing units to see whether the reference area is the same as the corresponding reference area background;
   when the reference area of the second input image received from each of the other image capturing units is the same as the corresponding reference area background, continually receiving a third input image and respectively accumulate the compensation image number; and
   continually performing the checking process until the reference area of each of the third input images received from the other image capturing units is not the same as the corresponding reference area background, and respectively compensating time difference of each of the image capturing units according to the compensation image number corresponding to each of the image capturing units.

2. The method for compensating time difference between images as claimed in claim 1, further comprising:
   when the reference area of the first input image received from each of the image capturing units is the same as the corresponding reference area background, setting each of the compensation image numbers to the same value.

3. The method for compensating time difference between images as claimed in claim 2, further comprising:
   reading out one of the first, second and third input image of each of the image capturing units corresponding to each of the compensation image numbers as a compensated image respectively.

4. The method for compensating time difference between images as claimed in claim 3, wherein the method of setting the reference area comprising:
   dividing a screen area and an environment area in each of the first, second and third input images of the image capturing units, wherein a position of the reference area is located in the environment area.

5. The method for compensating time difference between images as claimed in claim 4, wherein the method of setting the reference area background comprising:
   reading out an image from each of the first, second and third input images received from the image capturing units and saving the image as the reference area background according to the position of the reference area when the image capturing units start to perform.

6. The method for compensating time difference between images as claimed in claim 5, wherein the step of checking whether the reference area of each of the first, second and third input images is the same as the corresponding reference area background comprising:
   using the reference area background of each of the first, second and third input images to obtain a background removed image;
   removing a noise of the background removed image according to a first threshold value and performing a binary conversation on the background removed image to obtain a binary conversation image;
   calculating the number of white spots of a plurality of columns of the binary conversation image so as to compare the number of the white spots of the columns with a second threshold value;

when the number of the white spots is less than the second threshold value, determining the reference area of the corresponding one of the first, second and third input images is the same as the reference area background; and when the number of the white spots is greater than the second threshold value, determining the reference area of the corresponding one of the first, second and third input images is not the same as the reference area background.

7. The method for compensating time difference between images as claimed in claim 1, further comprising:
reading out one of the first, second and third input images of each of the image capturing units corresponding to each of the compensation image numbers as a compensated image respectively.

8. The method for compensating time difference between images as claimed in claim 7, wherein the method of setting the reference area comprising:
dividing a screen area and an environment area in each of the first, second and third input images of the image capturing units, wherein a position of the reference area is located in the environment area.

9. The method for compensating time difference between images as claimed in claim 8, wherein the method of setting the reference area background comprising:
reading out an image from each of the first, second and third input images received from the image capturing units according to the position of the reference area and saving the image as the reference area background when the image capturing units start to perform.

10. The method for compensating time difference between images as claimed in claim 9, wherein the step of checking whether the reference area of each of the first, second and third input images is the same as the corresponding reference area background comprising:
using the reference area background of each of the first, second and third input images to obtain a background removed image;
removing a noise of the background removed image and performing a binary conversation on the background removed image to obtain a binary conversation image;
calculating the number of white spots of a plurality of columns of the binary conversation image so as to compare the number of the white spots of the columns with a second threshold value;
when the number of the white spots is less than the second threshold value, determining the reference area of the corresponding one of the first second and third input images is the same as the reference area background; and
when the number of the white spots is greater than the second threshold value, determining the reference area of the corresponding one of the first, second and third input images is not the same as the reference area background.

11. The method for compensating time difference between images as claimed in claim 1, wherein the method of setting the reference area comprising:
dividing a screen area and an environment area in each of the first, second and third input images of the image capturing units, wherein a position of the reference area is located in the environment area.

12. The method for compensating time difference between images as claimed in claim 11, wherein the method of setting the reference area background comprising:
reading out an image from each of the first, second and third input images received from the image capturing units according to the position of the reference area and saving the image as the reference area background when the image capturing units start to perform.

13. The method for compensating time difference between images as claimed in claim 12, wherein the step of checking whether the reference area of each of the first, second and third input images is the same as the corresponding reference area background comprising:
using the reference area background of each of the first, second and third input images to obtain a background removed image;
removing a noise of the background removed image and performing a binary conversation the background removed image to obtain a binary conversation image;
calculating the number of white spots of a plurality of columns of the binary conversation image so as to compare the number of the white spots of the columns with a second threshold value;
when the number of the white spots is less than the second threshold value, determining the reference area of the corresponding one of the first, second and third input image is the same as the reference area background; and
when the number of the white spots is greater than the second threshold value, determining the reference area of the corresponding one of the first, second and third input image is not the same as the reference area background.

14. An electronic apparatus, comprising:
a plurality of image capturing units, respectively disposed in difference positions of the electronic apparatus; and
a processing unit, coupled to the image capturing units, respectively setting a reference area and a reference area background for each of the image capturing units, then respectively receiving a first input image from each of the image capturing units, respectively checking whether the reference area of each of the first input images is the same as a corresponding reference area background,
wherein when the reference area of the first input image received from one of the image capturing units is not the same as the corresponding reference area background and the reverence areas of the first input images received from the other image capturing units are the same as the reverence area backgrounds, wherein the processing unit received a second input image from the other image capturing units continually and respectively accumulates a compensation image number corresponding to each of the other image capturing units, and the second input image received from each of the other image capturing units is checked to see whether the reference area is the same as the corresponding reference area background,
wherein when the reference area of the another input image received from each of the other image capturing units is the same as the corresponding reference area background, the processing unit continually receives a third input image and respectively accumulates the compensation number,
wherein the processing unit continuously performs the checking process until the reference area of each of the third input images received from the other image capturing units is not the same as the corresponding reference area background, respectively compensates time difference of each of the image capturing units according to the compensation image number.

15. The electronic apparatus as claimed in claim 14, further comprising:
　　a storage unit, coupled to the processing unit, storing the first, second and third input images capturing by the image capturing units, wherein the processing unit reads out one of the first, second and third input images corresponding to the image capturing units as compensated images from the storage unit according to the compensation image number.

16. The electronic apparatus as claimed in claim 15, wherein the electronic apparatus is an optical touch panel.

\* \* \* \* \*